H. PIEPER.
METHOD OF IGNITION AND COMBUSTION OF COMBUSTIBLES IN INTERNAL COMBUSTION ENGINES.
APPLICATION FILED SEPT. 9, 1912.

1,398,944.

Patented Nov. 29, 1921.
3 SHEETS—SHEET 3.

UNITED STATES PATENT OFFICE.

HENRI PIEPER, OF LIEGE, BELGIUM.

METHOD OF IGNITION AND COMBUSTION OF COMBUSTIBLES IN INTERNAL-COMBUSTION ENGINES.

1,398,944.    Specification of Letters Patent.    Patented Nov. 29, 1921.

Application filed September 9, 1912. Serial No. 719,443.

(GRANTED UNDER THE PROVISIONS OF THE ACT OF MARCH 3, 1921, 41 STAT. L., 1313.)

*To all whom it may concern:*

Be it known that I, HENRI PIEPER, a subject of the King of Belgium, and resident of Liege, in the Kingdom of Belgium, have invented a certain new and useful Improvement in a Method of Ignition and Combustion of Combustibles in Internal-Combustion Engines; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

My invention relates to internal combustion engines and more particularly to the ignition and combustion of the working combustible of internal combustion motors having a combustion of approximately constant pressure. The usual type of internal combustion engines, in which the combustion takes place under approximately constant pressure, make use of high compression pressures as the Diesel motor and this is accompanied by series of disadvantages for instance a heavy and expensive construction and extemely heavy fly-wheels, or if high compression pressures be avoided the combustion is imperfect and bad and does not allow the use of the difficultly inflammable combustibles as for instance coal-tar products.

My invention has for its object a new process of ignition and combustion chiefly for internal combustion engines having a combustion of approximately constant pressure, which makes possible a sure and uniform combustion of any kind of difficultly inflammable combustibles without resorting to high unfavorable compression pressures and which allows a very favorable construction of the motor by reducing the clearance of the cylinder to a minimum. According to my invention an easily inflammable mixture is introduced into the working cylinder at an appropriate moment of the cycle and in such a quantity as to fill only an appropriate fraction of the whole piston displacement volume, there the mixture compressed at an appropriate pressure is ignited, and at the same time the working combustible mixed with air is introduced into the combustion chamber and burns during a certain time under an approximately constant pressure.

Figure 1:
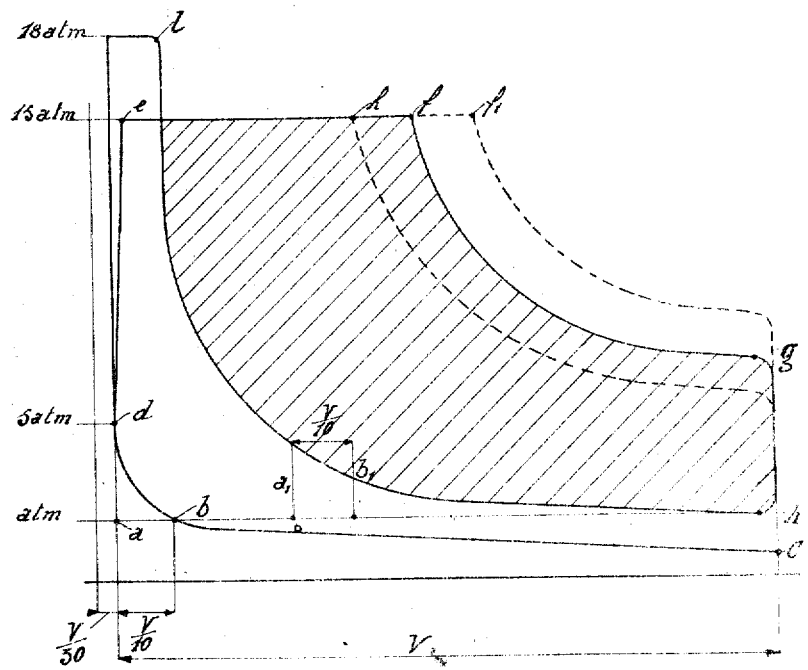
Figure 2:
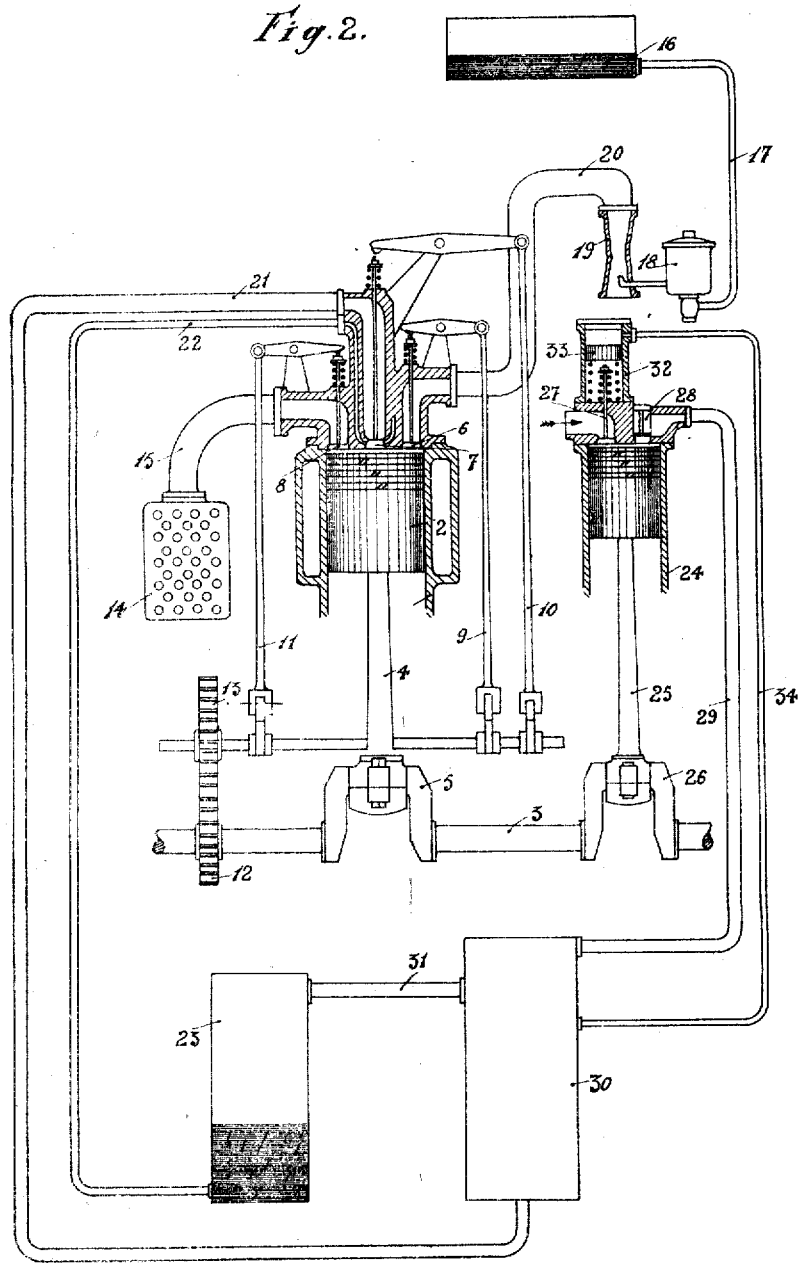
Figure 3:
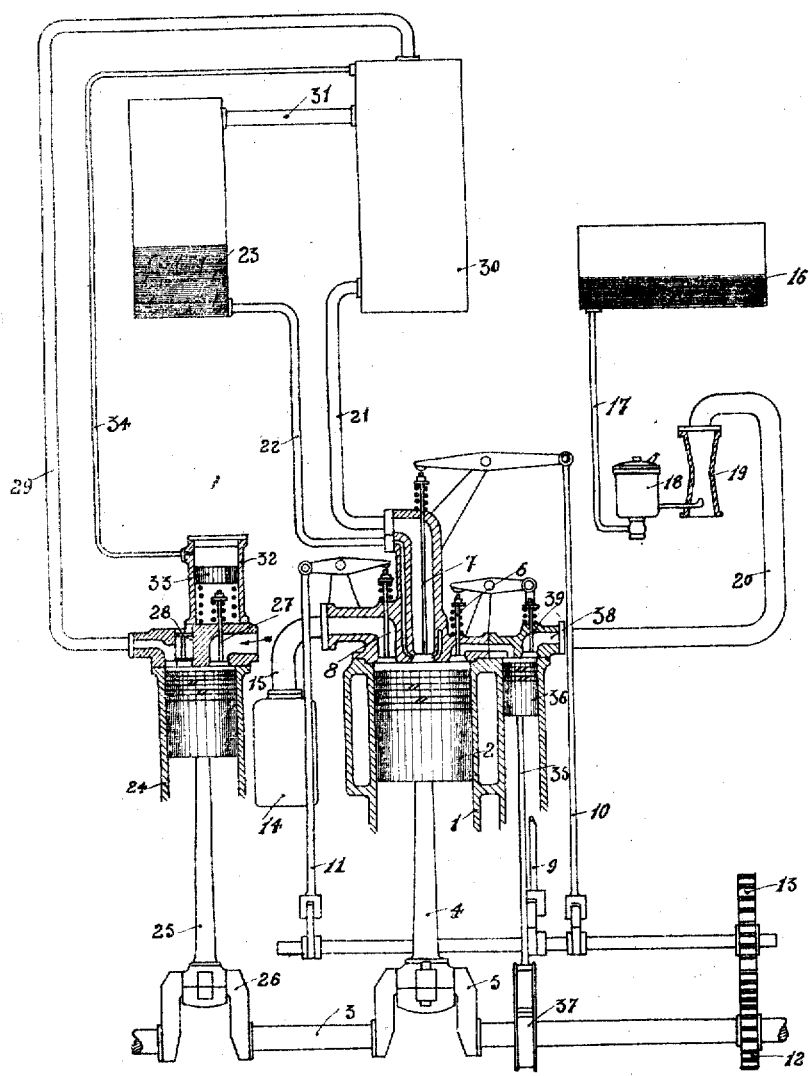

Referring to the accompanying drawings Figure 1 gives a diagram of working showing the method according to my invention, Fig. 2 shows the arrangement of a four stroke internal combustion engine working according to my invention and Fig. 3 illustrates the realization of my invention in the case of a two stroke cycle engine.

The diagram of Fig. 1 shows the method of working according to my invention for the case of a four stroke engine. In a well-known manner the pressures are here plotted as a function of the volume. On the first stroke during a certain part $a$—$b$ of the stroke an easily explosive mixture is introduced in the cylinder, which may be drawn in by an ordinary carbureter. The volume of this carbureted mixture may be for instance a tenth of the whole volume V displaced by the piston so that the length $a$—$b$ in the diagram corresponds to $\frac{V}{10}$. At the point $b$ the admission is closed and the auxiliary mixture expands with the further stroke of the piston about according to the curve $b$—$c$.

On the return of the piston the mixture is brought again back to the volume $\frac{V}{10}$ corresponding to the curve $c$—$b$. In this way the work previously lost by passing beyond the atmospheric pressure is recovered. During the last part $b$—$a$ of the second stroke the mixture is compressed according to the desired degree of compression that is to say according to the curve $b$—$d$. The degree of compression may be chosen as in the normal internal combustion engines in the clearance space having a volume equal to the third of the volume of the mixture sucked in by the piston, that corresponds to a degree of compression of the value 4, so that at point $d$ there exists a pressure of nearly 5 atmospheres.

At this moment the compressed mixture is ignited by means of any suitable ignition device. The pressure rises consequently nearly instantly to the explosion value—see point $e$—which is similar to that of normal internal combustion engines and amounts to about 15 atmospheres. At the same time the difficultly inflammable combustible is pressed into the combustion chamber. This introduction takes place in the way that a carbureted mixture of air and the working combustible, for instance petroleum, crude oil, and the like, is forced in a suitable quantity into the cylinder by an overpressure of about 2 or 3 atmospheres.

This mixture ignites instantly by coming into contact with the flames in the cylinder and burns without increase of pressure during the time of introduction. The inlet of the combustible is kept open during a part of the working stroke corresponding to the desired degree of filling. At point $f$ the combustion under constant pressure is terminated and the gases expand according to the adiabatic curve $f-g$. At the moment $g$ the exhaust valve is opened, the pressure sinks rapidly to the atmospheric pressure and on the fourth stroke the burnt gases are expelled. The cycle recommences.

The work which is required for the introduction under pressure of the difficultly inflammable combustible is represented by the curve $h-l$. The shaded area may be considered as representing the useful power of the engine. It is evident that this surface may be adapted to the load of the motor by varying the degree of filling which corresponds to a displacement of point $f$ to $f_1$ or $f_2$.

The diagram of Fig. 1 shows that the occurring pressures do not exceed the limits of a normal explosion motor, while the motors working according to the Diesel principle employ a compression of about 30 atmospheres. On the other hand the clearance is reduced to an extreme minimum. The usual explosion engines in which the same proportion between the volume of the clearance and that of the mixture sucked in during the suction stroke, for instance 1 to 3, is employed, have a clearance of $\frac{V}{3}$, the volume of the mixture sucked in during the suction stroke being equal in this case to the whole volume V displaced by the piston. My invention allows of reducing the volume of the mixture sucked in during the suction stroke to a fraction of the whole piston displacement volume V, for instance, as shown in the diagram of Fig. 1, to $\frac{V}{10}$ and consequently in assuming that this mixture is to compress also to the third of its original volume, there is a clearance space of $\frac{V}{30}$, as shown in Fig. 1. This gives the advantage that with the same degree of compression a considerable reduction of the necessary length of the cylinder is obtainable by diminishing the clearance space.

The combustion of the difficultly volatile combustible takes place gradually and without shock and the combustion pression changes scarcely with the diminishing load. By creating a combustion chamber in the cylinder which is entirely filled with flames of 1500° to 1600° and by forcing in this chamber filled with flames the heavy combustible finely vaporized in the same time by means of compressed air, an instantaneous and perfect combustion of the different molecules of the combustible mixed with air takes place at the moment of their introduction during the whole continuance of the filling. By this kind of ignition and combustion and introduction of the combustible it is possible to employ also very heavy combustibles without resorting to high compression pressures or to obtain only a partial or ununiform combustion. Furthermore an improvement from the point of view of consumption of combustible results from the fact that in consequence of the great quantity of heat which is disposed of at the moment of the introduction of the mixture, combustions are obtained, which develop their highest value of heat intensity. The combustion can be of course facilitated if the heavy combustible is mixed with an explosive gas or by first heating the combustible as well as the ignition mixture by means of the hot combustion gases or in another well known manner.

The object of the invention can of course be realized also in the case of a two-stroke engine in a similar way. If in the diagram of Fig. 1 it is supposed that the volume of the explosive mixture is introduced during the stroke $h-a$ before the moment $b$, for instance during the line $b_1-a_1$ the compression of this mixture takes place according to curve $b-d$ as in the preceding case. The ignition of the explosive mixture and the introduction of the heavy combustible will be effected also in the same way as in a four-stroke engine. The exhaust begins at the point $g$ and is terminated of course some time before point $b_1$.

Fig. 2 illustrates the arrangement of a four-stroke engine working according to my invention. In the cylinder 1 is working the piston 2, which is connected with the motor shaft 3 by means of crank 5 and connecting rod 4. In the head of the cylinder 1 three valves are arranged, the one of them 6 serves for the introduction of the explosive mixture, the other one 7 for the admission of the heavy combustible and the third one 8 for the exhaust of the burnt gases. The three valves are commanded by three suitable valve-gears 9, 10 and 11 which are actuated by the motor shaft 3 by means of cog-wheels 12 and 13. The valve 8 communicates with the exhaust 14 by a pipe 15. The reservoir 16 contains the explosive combustible which arrives through a pipe 17 in a constant level reservoir 18 and is mixed in the cone of the carbureter 19 with air and then driven through the pipe 20 to the valve 6.

The injector 7 is of any suitable system and represented as working with compressed air. This air is introduced through the pipe 21, while the heavy combustible, for instance crude oil, comes through the tube 22 from the reservoir 23. The over-pressure of air is produced by a compressor 24, the piston of which is actuated by the motor shaft by means of crank 26 and connecting rod 25. The valve 27 of the compressor serves for suction, the valve 28 communicates by a pipe 29 with the air reservoir 30, which is connected on the other end with the pipe 21 and a tube 31 coming from the reservoir 23. The dimensions of the ports in the injector 7 are chosen in such a way, that a suitable quantity of the mixture enters the cylinder; and from the same point of view the two pressures of air and heavy combustible are chosen. The inlet ports of the device 7, which may be called a carbureter under pressure, are chosen in such a manner, that all introduced air particles carry with them the required quantity of combustible so that an explosive mixture is formed which burns immediately on entering the cylinder. As the mixture is formed in the combustion chamber itself, a return of gases is impossible. The three valve gears may be regulated of course in any known manner.

The system shown in Fig. 2 operates in the following manner:

During the downward motion of the piston the valve 6 is opened for a certain time and the small volume of the explosive mixture coming from the carbureter 19 enters the cylinder 1. This quantity can always remain the same, whatever may be the load on the motor.

In the last part of the upward motion of the piston 2 the explosive mixture is compressed to a very small volume according to the chosen degree of compression so that an extremely small clearance is obtained, which may be neglected with regard to the large clearances existing in usual explosion motors under the same conditions. At the upper dead point of the piston the ignition of the mixture takes place in a suitable manner. Consequently the chamber is instantly filled with flames and the pressure rises to the explosion value similarly to the usual explosion motors. In the same time the valve 7 is opened and the determined quantity of air and heavy combustible enters the explosion chamber under the pressure of the compressor. It takes fire at once and the combustion takes place under approximately constant pressure during a suitable part of the fourth stroke, according to the required power of the motor. Then the injector 7 is closed, the combustion under constant pressure is terminated and the piston moves downward during the latter part of this stroke under the influence of the expanding gases. At the lower dead point of the piston the exhaust port 8 is opened, the pressure is lowered to that of the atmosphere and during the following stroke the exhaust gases escape. The valve 8 is closed and the cycle begins again.

The regulation of the power of the motor may be effected by altering the quantity of combustible introduced by the injector 7. The quantity of combustible may be varied, for instance, in such a manner, that the opening time of the valve 7, corresponding always to the same angle of movement of the gear is maintained constant and combustible is admitted only during a part of this time, air, however, during the whole of opening time. It is evident that in this case the smaller quantity of combustible must always be injected under the best conditions of the ignition and combustion, so that it forms during its whole entrance with the air a correctly carbureted mixture.

Another means for regulating the power consists in altering the time for introduction as well of the air as of the heavy combustible. When in this case in consequence of the diminution of the introduction time the motor reduces its power, the pressure in the air reservoir 30 will increase, because the compressor working always with full power furnishes a greater quantity of air than corresponds to the power of the motor. It is, however, very important for the kind of ignition and combustion of the invention that the compressor regulates its power in proportion to the power of the motor in order to avoid losses and to have always the same pressure in the air reservoir 30. In order to obtain this the compressor is effected according to my invention in such a manner that the work consumed by it diminishes with the reduction of the motor power. As Fig. 2 shows, the valve 27 of the compressor, which opens into the atmospheric air, communicates through a tube 34 with the air reservoir 30. This tube is extended above the valve 27 to a cylinder, in which a piston 33 may slide against the effort of a spring 32 in order to open the valve 27. The spring 32 is calculated thus that the usual pressure in the reservoir 30 cannot displace the piston 33. If however this pressure increases corresponding to a diminution of the power of the motor, the resulting higher pressure forces the piston toward the valve 27, which is opened and the compressor runs without charge. If then the pressure decreases the piston 33 is raised again under the influence of the spring 32 and the compressor works normally. In this manner a constant pressure results always in the air reservoir and consequently an exact introduction of the combustible and an adaption of the compressor power to the power of the piston.

For a two-stroke engine my invention may be realized in a similar manner as it is illustrated in Fig. 3. This arrangement shows essentially the same parts as Fig. 2 only with the difference that in the introduction pipe for the explosive mixture a small pump is inserted a valve 39 of which communicates through the port 38 and the tube 20 with the carbureter 19, while another port opens immediately into valve 6. The mixture is drawn in by the downward stroke of the piston 36, which is actuated by the motor shaft by means of the connecting rod 35 and crank 37. The introduction of the explosive mixture into the working cylinder of the motor is regulated by the gear 9 of the valve 6.

The cycle of operation of the two-stroke motor according to Fig. 3 is executed in the following manner. About at the end of the working stroke the valve 8 is opened and the exhaust begins. Simultaneously a certain quantity of scavenging air may be admitted to the cylinder in order to accelerate the exhaust of the burnt gases. The exhaust valve 8 is closed at an appropriate moment of the upward stroke for instance at ⅓ length of this stroke. A certain volume of scavenging air remains in the cylinder. On the rest of the upward stroke the explosive combustible may be admitted at a certain moment, the admission valve 6 being opened and the pump 36 effecting the introduction. The auxiliary combustible may be driven in alone or mixed only with a little quantity of air required for its admission, the quantity of air required for its combustion being represented by the air remaining after the exhaust in the cylinder. But by choosing conveniently the moment and the time of the admission the introduction of the auxiliary mixture may be executed in such a manner that the principal quantity of the air required for the combustion of the explosive combustible is driven in by the pump simultaneously with this combustible. The explosive mixture formed in the cylinder is compressed by the piston during the rest of the upward stroke, the valve 6 being closed at an appropriate moment, and then the ignition and the explosion of the auxiliary mixture takes place. In the chamber filled with flames the heavy combustible coming from the reservoir 23 through the pipe 22 and simultaneously the required quantity of combustion air coming from the reservoir 30 are introduced under the pressure of the compressor 24. This working mixture burns according to the time of introduction, the valve 7 being open a determined time in conformity with the required motor power. After the working stroke the cycle recommences.

It is evident that besides the described forms of execution there are other realizations possible. Likewise the method of ignition and combustion representing the object of my invention is not only of a great advantage in the case where the combustion takes place under constant pressure, but it may also be supposed that at the moment of ignition an increase of the pressure of the combustible takes place and the ignition had been effected previously by means of the auxiliary mixture according to my invention. For such a motor it results likewise the great advantage of a very small clearance and of a perfect combustion. But for all constructions the following points are essential: An explosive mixture of a quantity equal only to a suitable part of the whole piston displacement volume, admission of this mixture immediately into the working cylinder during a suitable part of a convenient piston stroke, compression and ignition of this mixture, a heavy combustible introduced into the explosion chamber simultaneously with the quantity of air required for its combustion in such a manner that a correctly carbureted mixture of air and working combustible is produced at the moment of the entrance into the cylinder.

Having thus described my invention I declare that what I claim as new and desire to secure by Letters Patent is:—

1. The method of operating an internal combustion engine, which comprises admitting into the cylinder a volume of combustible mixture or firing charge equal to a small fraction of the whole capacity of the cylinder, said charge including a quantity of air not exceeding that strictly necessary for its complete combustion, compressing said charge in a substantially undiluted condition, igniting said charge, admitting into the cylinder a combustible mixture including a quantity of air at least equal to that necessary for its complete combustion and simultaneously igniting said last mentioned mixture by means of said firing charge.

2. The method of operating an internal combustion engine, which comprises admitting into the cylinder a volume of combustible mixture or firing charge equal to a small fraction of the whole capacity of the cylinder, said charge comprising an easily inflammable fuel and a quantity of air not exceeding that strictly necessary for its complete combustion, compressing said charge in a substantially undiluted condition, igniting said charge, admitting into the cylinder a combustible mixture comprising a less inflammable fuel and a quantity of air at least equal to that necessary for its complete combustion and simultaneously igniting said last mentioned mixture by means of said firing charge.

3. In the method of operating an internal combustion engine which comprises the introduction into the cylinder of separate amounts of fuel before and after the piston has reached its dead point, the steps which consist in introducing with the first amount of fuel an amount of air not exceeding that strictly necessary for its complete combustion, limiting the introduction of said fuel and air to a small portion of the suction or intake stroke, and preventing the ingress of air and fuel during the remainder of the suction or intake stroke.

4. In the method of operating an internal combustion engine which comprises the introduction into the cylinder of separate amounts of fuel before and after the piston has reached its dead point, the steps which consist in introducing successively with each amount of fuel separate amounts of air substantially equal to the amounts strictly necessary for insuring the complete combustion of the respective amounts of fuel, limiting the introduction of the fuel and air admitted before the piston has reached its dead point to a small portion of the suction or intake stroke, and preventing the ingress of air and fuel during the remainder of suction or intake stroke.

5. The method of operating a four-str internal combustion engine, which cons in admitting into the cylinder a volume combustible mixture or firing charge eq to a small fraction of the whole capacity the cylinder, said charge comprising easily inflammable fuel and a quantity air not exceeding that strictly necessary its complete combustion, preventing the gress of air and fuel during the remain of the suction stroke, compressing s charge in a substantially undiluted con tion, igniting said charge, admitting i the cylinder a combustible mixture c prising a less inflammable fuel and a qu tity of air at least equal to that necess for its complete combustion and simulta ously igniting said last mentioned mixt by means of said firing charge, and exhau ing the products of combustion.

In testimony whereof I affix my signat in presence of two witnesses.

HENRI PIEPER

Witnesses:
S. M. HEPBIN,
A. P. CRUGER.